United States Patent [19]

Midgely et al.

[11] Patent Number: 5,604,862
[45] Date of Patent: Feb. 18, 1997

[54] CONTINUOUSLY-SNAPSHOTTED PROTECTION OF COMPUTER FILES

[75] Inventors: Christopher W. Midgely, Framingham; Charles J. Holland, Northboro; John W. Webb, Sutton; Manuel Gonsalves, Brookline, all of Mass.

[73] Assignee: Network Integrity, Inc., Marlborough, Mass.

[21] Appl. No.: 403,347

[22] Filed: Mar. 14, 1995

[51] Int. Cl.⁶ .................................................. G06F 11/34
[52] U.S. Cl. ..................... 395/182.04; 395/488; 395/859
[58] Field of Search ............................ 395/181, 182.03, 395/182.04, 182.05, 427, 444, 445, 859, 488, 489; 371/7

[56] References Cited

U.S. PATENT DOCUMENTS

| | | | |
|---|---|---|---|
| 4,310,883 | 1/1982 | Clifton et al. | 364/200 |
| 5,086,502 | 2/1992 | Malcolm | 364/200 |
| 5,163,148 | 11/1992 | Walls | 364/200 |
| 5,210,866 | 5/1993 | Milligan et al. | 364/200 |
| 5,239,647 | 8/1993 | Anglin et al. | 364/200 |
| 5,247,660 | 9/1993 | Ashcraft et al. | 364/900 |
| 5,263,154 | 11/1993 | Eastridge et al. | 364/268.2 |
| 5,276,860 | 1/1994 | Fortier et al. | 364/200 |
| 5,276,867 | 1/1994 | Kenley et al. | 395/600 |
| 5,367,698 | 11/1994 | Webber et al. | 364/200 |
| 5,386,545 | 1/1995 | Gombos, Jr. et al. | 395/700 |
| 5,403,639 | 4/1995 | Belsan et al. | 395/600 |

FOREIGN PATENT DOCUMENTS

WO94/17473 8/1994 WIPO ............................ G06F 11/14
WO94/17474 8/1994 WIPO ............................ G06F 11/14

OTHER PUBLICATIONS

ProServe CX "NLM Backup for Netware" Installation Guide, 1994.
Networker, Users Guide, 1994.
ProServe CX "NLM Backup for Netware", Administrator's Guide, 1994.
Networker, Administrator's Guide, 1994.
White Paper, "St. Bernard Software Open File Manager", Mar. 7, 1995.

*Primary Examiner*—Robert W. Beausoliel, Jr.
*Assistant Examiner*—Albert Decady
*Attorney, Agent, or Firm*—Fish & Richardson P.C.

[57] ABSTRACT

An Integrity Server computer for economically protecting the data of a computer network's servers, and providing hot standby access to up-to-date copies of the data of a failed server. As the servers' files are created or modified, they are copied to the Integrity Server. The invention provides novel methods for managing the data stored on the Integrity Server, so that up-to-date snapshots of files of the protected file servers are stored on low-cost media such as tape, but without requiring that a system manager load large numbers of tapes.

31 Claims, 3 Drawing Sheets

Microfiche Appendix Included
(58 Microfiche, 2829 Pages)

| | | |
|---|---|---|
| integer | File ID | |
| date/time: | file's creation date/time | |
| date/time: | file's last access date/time | |
| date/time: | file's last archive date/time | |
| integer | object ID of owner | |
| integer | object ID of file modifier | |
| integer | object ID of file archiver | |
| integer | file attributes (hidden, system, etc.) | |
| integer | mask of maximum rights for object | |
| location of | the object in Integrity Server's cache | |
| integer | counter of the number of trustees | |
| ⋮314 | | ↖310 |

| | |
|---|---|
| kind: is this a server, a volume, a directory, or file? | |
| location of the version in Integrity Server's disk/tape | ⌐316 |
| date/time: date/time of file modification | |
| integer size of file version | |
| integer checksum of file contents | |

FIG. 3b

CONTINUOUSLY-SNAPSHOTTED PROTECTION OF COMPUTER FILES

REFERENCE TO MICROFICHE APPENDIX

A microfiche appendix is attached to this application. The appendix, which includes a source code listing of an embodiment of the invention, includes 2,829 frames on 58 microfiche.

A portion of the disclosure of this patent document contains material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

The invention relates to redundant storage of computer data for recovery from failures.

Known computer backup methods copy files from a computer disk to tape. In a full backup, all files of the disk are copied to tape, often requiring that all users be locked out until the process completes. In an "incremental backup," only those disk files that have changed since the previous backup, are copied to tape. If a file is corrupted, or the disk or its host computer fails, the last version of the file that was backed-up to tape can be restored by mounting the backup tape and copying the backup tape's copy over the corrupted disk copy or to a good disk.

Data can also be protected against failure of its storage device by "disk mirroring," in which data are stored redundantly on two or more disks.

In both backup systems and disk mirroring systems, a program using a restored backup copy or mirror copy may have to be altered to refer to the restored copy at its new location.

In hierarchical storage systems, intensively-used and frequently-accessed data are stored in fast but expensive memory, and less-frequently-accessed data are stored in less-expensive but slower memory. A typical hierarchical storage system might have several levels of progressively-slower and -cheaper memories, including processor registers, cache memory, main storage (RAM), disk, and off-line tape storage.

SUMMARY OF THE INVENTION

The invention provides methods and apparatus for protecting computer data against failure of the storage devices holding the data. The invention provides this data protection using hardware and storage media that is less expensive than the redundant disks required for disk mirroring, and protects against more types of data loss (for instance, user or program error) while providing more rapid access to more-recent "snapshots" of the protected files than is typical of tape backup copies.

In general, in a first aspect, the invention features a method for managing copies of a protected set of files on a bounded number of volumes of sequential-access media. In the method, one of the sequential-access media volumes is chosen as the current volume. When the contents of one of the protected files is altered, the new current version is copied to the current volume. When the current volume is full to a defined limit, a new volume is selected to be the current volume. The population of an active set (the minimum set of the most-recently-current of the volumes that together contain at least one version of each of the protected files) of the sequential-access volumes is maintained at or below the bounded number by periodically selecting a volume from the active set (typically the oldest) for compaction, and copying from the compaction volume to the current volume those versions of file versions stored on the compaction volume not having a more recent version stored on the active set. The copying and compacting steps continue while client nodes continue to alter the files of the servers.

Preferred embodiments of the first aspect may feature the following. New versions of protected files, and versions reclaimed from compaction volumes, are copied to a direct access storage cache and queued for later writing to the current volume. When file versions are dequeued, the queue is reviewed for later versions of the dequeued file: only the latest version of the dequeued file is actually written to the active volume, and other versions in the queue are purged. Storage records are maintained to record the storage locations of file versions in the storage volumes so that the file versions can be accessed promptly. Recently-compacted volumes are maintained as a legacy set of volumes containing additional copies of current versions and non-current versions of files, and the storage records are maintained to track the contents of the legacy volumes. The volumes are cartridge tapes kept in an autoloader, and tape mounts/dismounts are automatically scheduled by software. A second set of volumes is also written concurrently; this set of volumes contains less-frequent snapshots than the active set, and a policy ensures that at least one version of each of the protected files is copied to the archival set within a bounded maximum interval.

In a second aspect, the invention provides a method for protecting the data files of a computer, as the files are created and altered by an external process. In the method, recently-altered protected files are snapshotted to a storage cache. A new snapshot of a given file displaces any older snapshot of the same file from the storage cache. Later, non-displaced snapshotted versions are copied from the storage cache to removable mass storage media. This second copying phase proceeds at a lower rate, so that a significant proportion of the snapshotted versions of rapidly-changing files are displaced from the archive storage cache.

Preferred embodiments may include the following features. The protected direct-access mass storage device includes the individual mass storage devices of file server nodes of a computer network. The content of the stored snapshots periodically verified against the protected files. This verification may use a technique that avoids copying contents of verified files over the network, or reading the removable media, by comparing a summary value of the content of a protected file with a summary value of the content of the stored snapshot. Stable protected files, those not recently altered, are periodically snapshotted, thereby to generate a media archive of all protected files, suitable for off-site storage. Periodically, the off-site media are selectively expired, leaving short sequences of consecutive media that, taken together, store at least one copy of every protected file. Various scheduling policies are available for the snapshotting: continuous scanning, at a specified time of day, in response to specific system events, or on demand.

In a third aspect, the invention features a method in which files of a file system are traversed for snapshotting to removable storage media. A record is kept of the files currently held open for snapshotting. When an client process requests access to a file, the record is consulted to determine whether the file is currently open by the protection process. If the file is currently held open by the protection process, the client is blocked until the protection process releases the file. If the file is not currently held open by the protection process, or when the protection process completes the snapshotting, the file is opened in accord with the file open protocol of the protected computer.

The invention has many advantages, including the following. A nearly-up-to-date copy of every file of the protected set is always available in the storage cache or the removable media. The snapshots can be used either to restore an image of a protected server if the server fails, or a user can get access to historical snapshots of files, for instance to compare the current version of a file to a version for a specified prior time. An ordinary user can, in seconds, access any file snapshot that was stored on an unavailable server node, or can request a restore of any version snapshot available to the Integrity Server.

The active set can replace daily incremental backup tapes, to restore the current or recent versions of files whose contents are corrupted or whose disk fails. Note, however, that the data on the active set has been sampled at a much finer rate than the data of a daily backup. Thus, a restore recovers much more recent data than the typical restore from backup.

Known backups are driven by a chronological schedule that is independent of the load on the server node. Thus, when the backup is in progress, it can further slow an already-loaded node. They also periodically retransmit all of the data on the server nodes, whether changed or not, to the off-line media. The software of the invention, in contrast, never retransmits data it already has, and thus transmits far less data. Furthermore, it transmits the data over longer periods of time and in smaller increments. Thus, the invention can provide better data protection with less interference with the actual load of the server.

Other advantages and features of the invention will become apparent from the following description of preferred embodiments, from the drawings, and from the claims.

BRIEF DESCRIPTION OF THE DRAWING

FIG. 1 shows the flow of data through the network and the tapes of the Integrity Server, and FIGS. 2a and 2b show the network automatically reconfiguring itself as a server fails.

FIGS. 3a and 3b are block diagrams showing two of the data structures making up the Integrity Server catalog.

DESCRIPTION OF PREFERRED
EMBODIMENTS

Figure 1:
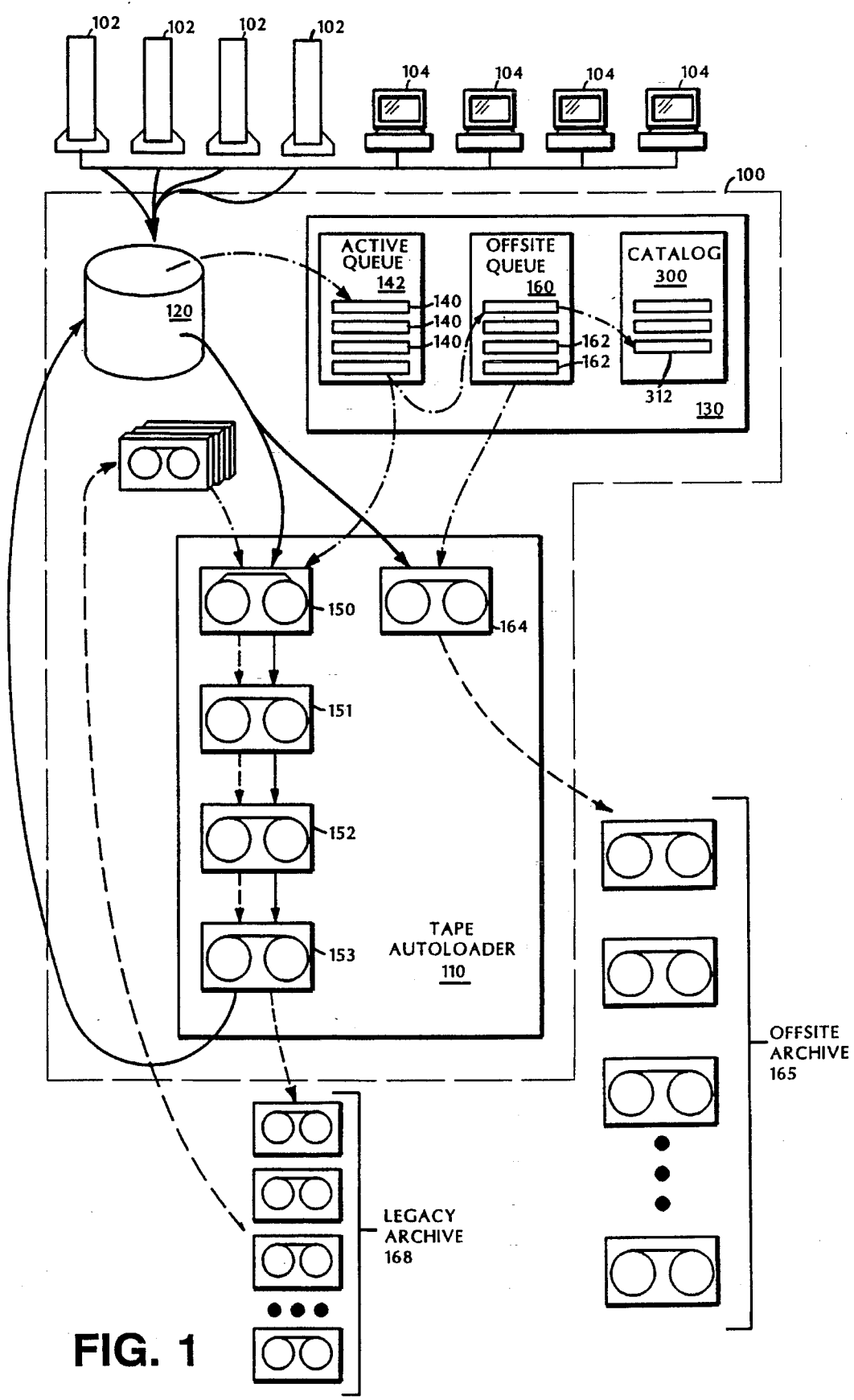
FIGS. 1, 2a, and 2b are block diagrams of a computer network, showing servers, client nodes, and an Integrity Server.

A commercial embodiment of the invention is available from Network Integrity, Inc. of Marlboro, Mass.
System Overview Referring to FIGS. 1, 2a, and 2b, the Integrity Server system operates in two main modes: protection mode and stand-in mode. When all file servers 102 under the protection of Integrity Server 100 are operational (FIGS. 1 and 2a), the system operates in protection mode: Integrity Server 100 receives up-to-date copies of the protected files of the servers 102. When any protected server 102 goes down (FIGS. 1 and 2b), the system operates in stand-in mode: Integrity Server 100 provides the services of the failed server 102, while still protecting the remaining protected servers 102. The software is divided into three main components: the agent NLM (NetWare Loadable Module) that runs on the server nodes 102, the Integrity Server NLM that runs on the Integrity Server 100 itself, and a Management Interface that runs on a network manager's console as a Windows 3.1 application.

Integrity Server 100 is a conventional network computer node configured with a tape autoloader 110 (a tape "juke box" that automatically loads and unloads tape cartridges from a read/write head station), a disk 120, storage 130 (storage 130 is typically a portion of the disk, rather than RAM), and a programmed CPU (not shown).

After a client node 104 updates a file of a file server 102, producing a new version of the file, the agent process on that file server 102 copies the new version of the file to the Integrity Server's disk 120. As the file is copied, a history package 140 is enqueued at the tail of an active queue 142 in the Integrity Server's storage 130; this history package 140 holds the data required for the Integrity Server's bookkeeping, for instance telling the original server name and file pathname of the file, its timestamp, and where the Integrity Server's current version of the file is stored. History package 140 will be retained in one form or another, and in one location or another (for instance, in active queue 142, offsite queue 160, or the catalog—see FIGS. 3a –3b) for as long as the file version itself is managed by Integrity Server 100.

When history package 140 reaches the head of active queue 142, the file version itself is copied from disk 120 to the current tape 150 in autoloader 110. History package 140 is dequeued to two places. History package 140 is enqueued to off-site queue 160 (discussed below), and is also stored as history package 312 in the protected files catalog, in a format that allows ready lookup given a "\\server\file" pathname, to translate that file pathname into a tape and an address on that tape at which to find the associated file version.

As tape 150 approaches full, control software unloads current tape 150 from the autoloader read/write station, and loads a blank tape as the new current tape 150. The last few current tapes 151–153 (including the tape 150 recently removed, now known as tape 151) remain in the autoloader as the "active set" so that, if one of servers 102 fails, the data on active set 150–153 can be accessed as stand-in copies of the files of the failed server 102.

When a file version is written to active tape 150, its corresponding history package 140 is dequeued from active queue 142 and enqueued in off-site queue 160. When an off-site history package 162 reaches the head of off-site queue 160, the associated version of the file is copied from disk 120 to the current off-site tape 164, and the associated history package 312 is updated to reflect the storage of the data to offsite media in the protected file catalog. History package 312 could now be deleted from disk 120. When current off-site tape 164 is full, it is replaced with another blank tape, and the previous off-site tape is removed from the autoloader, typically for archival storage in a secure off-site archive, for disaster recovery, or recovery of file versions older than those available on the legacy tapes.

The size of the active tape set 150–153 is fixed, typically at three to four tapes in a six-tape autoloader. When a new current tape 150 is about to be loaded, and the oldest tape 153 in the set is about to be displaced from the set, the data on oldest tape 153 are compacted: any file versions on tape 153 that are up-to-date with the corresponding files on protected servers 102 are reclaimed to disk cache 120, from where the file will again be copied to the active and off-site tapes. Remaining file versions, those that have a more-recent version already on tapes 150–152 or on disk 120, are omitted from this reclamation. Once the data on tape 153 has been reclaimed to disk 120, tape 153 can be removed from the autoloader and stored as a legacy tape, typically either kept on-site for a few days or weeks before being considered blank and reused as a current active tape 150 or off-site tape 164, or retained for years as an archive. The data reclaimed from tape 153 are copied from disk 120 to now-current tape 150. The reclaimed data are then copied to tape 164 as previously described. This procedure not only maintains a compact number of active tapes, but also ensures that a complete set of data from servers 102 will appear in a short sequence of consecutive offsite tapes, without requiring recopying all of the data from the servers 102 or requiring access to the offsite tapes.

Figure 2A:
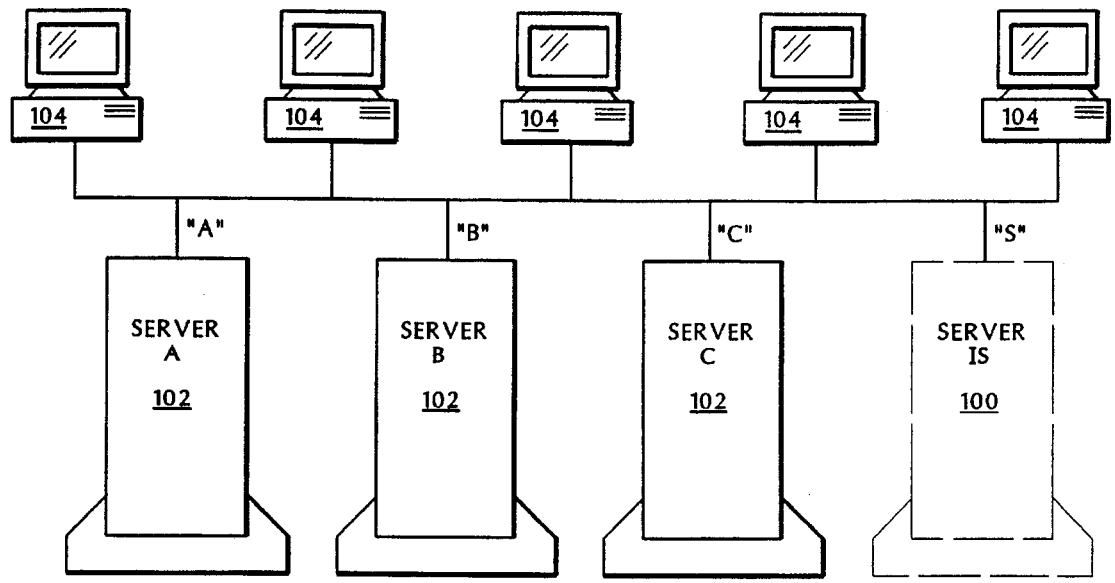

Referring to FIG. 2a, as noted earlier, as long as all servers 102 are functioning normally, all clients 104 simply read and write files using normal network protocols and requests, and agent processes on each of the servers 102 periodically copy all recently-modified files to Integrity Server 100. Integrity Server 100, at least in its role of protecting file servers 102, is essentially invisible to all clients 104.

Figure 2B:
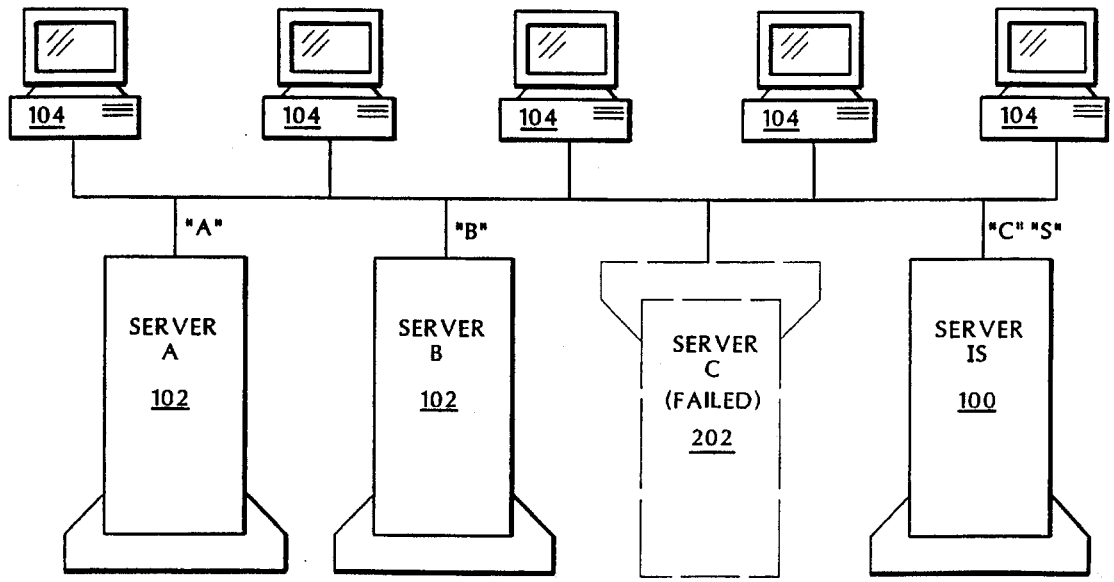

Referring to FIG. 2b, after one of servers 202 fails, Integrity Server 100 enters stand-in mode (either automatically or on operator command). Integrity Server 100 immediately begins building a replica of the protected server's volume and directory structure, using the information stored on disk 120 and tapes 150–153, 164. Integrity Server 100 assumes the identity of failed server 202 during connect requests, intercepts network packets sent to failed server 202, and provides most of the services ordinarily provided by failed server 202. Clients 104 still request data from failed server 202 using unaltered protocols and requests. However, these requests are actually serviced by Integrity Server 100, using the replica of the failed server's file system. This stand-in service is almost instantaneous, with immediate access to recently-used files, and a few seconds' delay (sometimes one or two seconds, usually within a minute, depending on how near the tape data are to the read/write head) for files not recently used. During the time that Integrity Server 100 is standing in for failed server 202, it continues to capture and manage protection copies of the files of other servers 102. When the failed server 202 is recovered and brought back on line, files are synchronized so that no data are lost.

Referring again to FIG. 1, Integrity Server 100 has a disk 120, a tape auto-loader, and runs Novell NetWare version 4.10 or later, a client/server communications system (TIRPC), and a file transport system (Novell SMS). An example tape auto-loader 110 is an HP 1553c, that holds six 8 GB tapes.

Each protected server 102 runs Novell NetWare, version 3.11 or later, TIRPC, Novell SMS components appropriate to the NetWare version, and runs an agent program for copying the modified files.

The clients 104 run a variety of operating systems, including Microsoft Windows, OS/2, NT, UNIX, and Macintosh. At least one client node runs Microsoft Windows and a System Manager's Interface for monitoring and controlling the Integrity Server software.

Detailed System Operation

Referring again to FIG. 1, in protection mode, Integrity Server 100 manages its data store to meet several objectives. The most actively used data are kept in the disk cache 120, so that when the Integrity Server is called on to stand in for a server 102, the most active files are available from disk cache 120. All current files from all protected servers 102 are kept on tape, available for automatic retrieval to the disk cache for use during stand-in, or for conventional file restoration. A set of tapes is created and maintained for off-site storage to permit recovery of the protected servers and the Integrity Server itself if both are destroyed or inaccessible. All files stored on tape are stored twice before the disk copy is removed, once on active tape 150 and once on offsite tape 164.

A continuously protected system usually has the following tapes in its autoloader(s): a current active tape 150, the rest of the filled active tapes 151–153 of the active set, possibly an active tape that the Integrity Server has asked the System Manager to dismount and file in legacy storage, one current offsite tape 164, possibly a recently-filled off-site tape, possibly a cleaning tape, and several blank (or overwritable) tapes.

The server agents and Integrity Server 100 maintain continuous communication, with the agents polling the Integrity Server for instructions, and copying files. Based on a collection of rules and schedules selected by the system manager, agents perform tasks on a continuous, scheduled, or demand basis. Each agent continuously scans the directories of its server looking for new or changed files, detected, for example, using the file's NetWare archive bit or its last modified date/time stamp. Similarly, newly-created files are detected and copied to the Integrity Server. In normal operation, a single scan of the directories of a server takes on the order of fifteen minutes. If a file changes several times within this protection interval, only the most recent change will be detected and copied to the Integrity Server. A changed file need not be closed to be copied to the Integrity Server, but it must be sharable. Changes made to non-sharable files are protected only when the file is closed.

In one embodiment, the protected server's protection agent registers with the NetWare file system's File System Monitor feature. This registration requests that the agent be notified when a client requests a file open operation, prior to the file system's execution of the open operation. When a Protected Server's protection agent opens a file, the file is opened in an exclusive mode so that no other process can alter the file before an integral snapshot is sent to the Integrity Server. Further, the agent maintains a list of those files held open by the agent, rather than, e.g., on behalf of a client. When a client opens a file, the protection agent is notified by the File System Monitor and consults the list to determine if the agent currently has the file open for snapshotting to the Integrity Server. While the agent has the file open, the client process is blocked (that is, the client is held suspended) until the agent completes its copy operation. When the agent completes its snapshot, the client is allowed to proceed. Similarly, if the agent does not currently have the file open, a client request to open a file proceeds normally.

When an agent process of one of the file servers detects a file update on a protected server 102, the agent copies the file new version of the changed file and related system data to the Integrity Server's disk cache 120. (As a special case, when protection is first activated, the agent walks the server's directory tree and copies all files designated for protection to the Integrity Server.) The Integrity Server queues the copied file in the active queue 142 and then off-site queue 160 for copying to the active tape 150 and off-site tape 164, respectively. Some files may be scheduled for automatic periodic copying from server 102 to Integrity Server 100, rather than continuous protection.

The population of files in the disk cache 120 is managed to meet several desired criteria. The inviolable criterion is that the most-recent version of a file sampled by the server's agent process always be available either in disk cache 120 or on one of the tapes 150–153,164 of the autoloader. Secondary criteria include reducing the number of versions retained in the system, and maintaining versions of the most actively used files on the disk cache so that they will be rapidly ready for stand-in operation.

A given file version will be retained in disk cache 120 for at least the time that it takes for the version to work its way through active queue 142 to active tape 150, and through offsite queue 160 for copying to current off-site tape 164. Once a file version has been copied to both the active and off-site tapes, it may be kept on disk 120 simply to provide the quickest possible access in case of failure of the file's protected server. The version may be retained until the disk cache 120 approaches being full, and then the least active file versions that have already been saved to both tapes are purged.

Redundant versions of files are not required to be stored in cache 120. Thus, when a new version of a protected file is completely copied to disk cache 120, any previous version stored in cache 120 can be erased (unless, for instance, that version is still busy, for instance because it is currently being copied to tape). When a new version displaces a prior version, the new history package is left at the tail of the active queue so that the file will be retained in disk cache 120 for the maximum amount of time. As files are dequeued from active queue 142 for copying to active tape 150, the most-recent version of the file already in the disk cache is written to tape, and all older versions are removed from the queue.

The active tape set 150–153 and the data stored thereon is actively managed by software running on Integrity Server 100, to keep the most recent file versions readily available on a small number of tapes. Data are reclaimed from the oldest active tape 153 and compacted so that the oldest active tape can be removed from the autoloader for storage as a legacy tape 168. Compaction is triggered when the density of the data (the proportion of the versions on the active tape that have not been superseded by more-recent versions, eg. in the disk cache or later in the active tape set), averaged across all active tapes 150–153 currently in the autoloader, falls below a predetermined threshold (e.g. 70%), or when the number of available blank tapes in autoloader 110 falls below a threshold (e.g., 2). In the compaction process, the file versions on oldest active tape 153 that are up to date with the copy on the protected server, and thus which have no later versions in either disk cache 120 or on a newer active tape 150–152, are reclaimed by copying them from oldest active tape 153 to the disk cache 120 (unless the file version has been retained in disk cache 120). From disk cache 120, the version is re-queued for writing to a new active tape 150 and off-site tape 164, in the same manner as described above for newly-modified files. This re-queuing ensures that even read-active (and seldom-modified) data appear frequently enough on active tapes 150 and off-site tapes 165 to complete a restorable set of all protected files. Since all data on oldest active tape 153 are now either obsolete or replicated elsewhere 120,150–152 on Integrity Server 100, the tape 153 itself may now be removed from the autoloader for retention as a legacy tape 168.

The compaction process ensures that every protected file has an up-to-date copy accessible from the active tape set. Once the active tape set has been compacted, i.e., current files have been copied from the oldest active tape 153 to the newest active tape 150 and an off-site tape 164, the oldest active tape is designated a legacy tape 168, and is ready to be removed from the autoloader. Its slot can be filled with a blank or expired tape.

The process of reclamation and compaction does not change the contents of the oldest active tape 153. All of its files remain intact and continue to be listed in the Integrity Server's catalog. A legacy tape and its files are kept available for restoration requests, according to a retention policy specified by the system manager. Legacy tapes are stored, usually on-site, under a user-defined rotation policy. When a legacy tape expires, the Integrity Server software removes all references to the tape's files from the catalog. The legacy tape can now be recycled as a blank tape for reuse as an active or off-site tape. The Integrity Server maintains a history of the number of times each tape is reused, and notifies the system manager when a particular tape should be discarded.

Note that the process of reclaiming data from the oldest active tape 153 to disk cache 120 and then compacting older, non-superseded versions to active tape 150 allows the Integrity Server 100 to maintain an up-to-date version of a large number of files, exploiting the low cost of tape storage, while keeping bounded the number of tapes required for such storage, without requiring periodic recopying of the files from protected servers 102. The current set of active tapes should remain in the autoloader at all times so that they can be used to reconstruct the stored files of a failed server, though the members of the active tape set change over time.

By ensuring that every protected file is copied to offsite tape 164 with a given minimum frequency (expressed either in time, or in length of tape between instances of the protected file), the process also ensures that the offsite tapes 165 can be compacted, without physically accessing the offsite tape volumes.

In an alternate tape management strategy, after reclaiming the still-current file versions from oldest active tape 153, this tape is immediately recycled as the new active tape 150. This forgoes the benefit of the legacy tapes' maintenance of recent file versions, but reduces human intervention required to load and unload tapes.

Writing files from the off-site queue 160 to off-site tape 164 is usually done at low priority, and the same version culling described for active queue 142 is applied to off-site queue 160. The relatively long delay before file versions are written to off-site tape 164 results in fewer versions of a rapidly-changing file being written to the off-site tape 164, because more of the queued versions are superseded by newer versions.

Whether it has been updated or not, at least one version of every protected file is written to an off-site tape with a maximum number of sequential off-site tapes between copies. This ensures that every file appears on at least every $n^{th}$ tape (for some small n), and ensures that any sequence of n consecutive off-site tapes contains at least one copy of every protected file, and thus that the sequence can serve the function of a traditional backup tape set, providing a recovery of the server's files as they stood at any given time.

Active queue 142 is written to current active tape 150 from time to time, for instance every ten minutes. Off-site queue 160 is written to off-site tape 164 at a lower frequency, such as every six hours.

Even though off-site tapes are individually removed from the autoloader and individually sent off-site for storage, successive tapes together form a "recovery set" that can be used to restore the state of the Integrity Server in case of disaster. The circularity of the tape compaction process ensures that at least one version of every file is written to an off-site tape with a maximum number of off-site tapes intervening between copies of the file, and thus that a small number of consecutive off-site tapes will contain at least one version of every protected file. To simplify the process of recovery, the set of off-site tapes that must be loaded to the Integrity Server to fully recover all protected data is dynamically calculated by the Integrity Server at each active tape compaction, and the tape ID numbers of the recovery set ending with each off-site tape can be printed on the label generated as the off-site tape is removed from the autoloader. When a recovery is required, the system manager simply pulls the latest off-site tape from the vault, and also the tapes listed on that tape's label, to obtain a set of off-site tapes for a complete recovery set.

Many tape read errors can be recovered from with no loss of data, because many file versions are redundantly stored on the tapes (e.g., a failure on an active tape may be recoverable from a copy stored on an off-site tape).

Policies for retention and expiration of off-site tapes may be configured by the system manager. For instance, all off-site tapes less than one month old may be retained. After that, one recovery set per month may be retained, and the other off-site tapes for the month expired for reuse as active or off-site tapes. After six months, two of every three recovery sets can be expired to retain a quarterly recovery set. After three years, three of every four quarterly recovery sets can be expired to retain a yearly recovery set.

Expired off-site tapes cannot be used to satisfy file restoration requests, because the history packages for the tape will have been purged from the catalog. But these tapes may still be used for Integrity Server recovery, as long as a full recovery set is available and all tapes in the set can be read without error.

The history packages are maintained on disk 120, rather than in the RAM of the Integrity Server, so that they will survive a reboot of the Integrity Server. The history packages are linked in two ways. Active queue 142 and off-site queue 160 are maintained as lists of history packages, and the history packages are also maintained in a tree structure isomorphic to the directory tree structure of the protected file systems. Using the tree structure, a history package can be accessed quickly if the file version needs to be retrieved from either the active tape set 150–153 or from an off-site tape, either because Integrity Server 100 has been called to stand in for a failed server, or because a user has requested a restore of a corrupted file.

File versions that have been copied to both active tape 150 and off-site tape 164 can be erased from disk cache 120. In one strategy, files are only purged from disk cache 120 when the disk approaches full. Files are purged in least-recently accessed order. It may also be desirable to keep a most-recent version of certain frequently-read (but infrequently-written) files in disk cache 120, to provide the fastest-possible access to these files in case of server failure.

Depending on which tape (an active tape 150 or an off-site tape 164) is loaded into the autoloader's read/write station and the current processing load of the Integrity Server, a given file version may take anywhere from a few minutes to hours to be stored to tape. The maximum time bound is controlled by the System Manager. Typically a file version is stored to active tape 150 as quickly as possible, and queued for the off-site tape at a lower priority.

Verification of tape writes may be enabled by the System Manager Interface. When tape write verification is enabled, each queue is fully written to tape, and then the data on the tape are verified against the data in disk cache 120. Files are not requeued from the active tape queue 142 to the off-site queue 160 until the complete active tape 150 is written and verified.

If Integrity Server 100 has multiple auto-loaders installed, a new active or off-site tape can be begun by simply switching auto-loaders. Tape head cleaning is automatically scheduled by the system.

In some embodiments, a System Manager can request that a specified file be protected within a specific time window, such as when there is no update in progress or when the file can be closed for protection purposes.

Referring to FIGS. 3*a* and 3*b*, a catalog records where in the Integrity Server (e.g, on disk 120, active tapes 150–153, legacy tapes 168, or off-site tapes 164–165) a given file version is to be found. It contains detailed information about the current version of every file, such as its full filename, timestamp information, file size, security information, etc. Catalog entries are created during protection mode as each file version is copied from the protected server to the Integrity Server. Catalog entries are altered in form and storage location as the file version moves from disk cache 120 to tape and back. The catalog is used as a directory to the current tapes 150–153, legacy tapes, and off-site tapes 164 when a user requests restoration of or access to a given file version.

FIGS. 3*a* and 3*b* show two data structures that make up the catalog. The catalog has entries corresponding to each leaf file, each directory, each volume, and each protected server, connected in trees corresponding to the directory trees of the protected servers. Each leaf file is represented as a single "file package" data structure 310 holding the stable properties of the file. Each file package 310 has associated with it one or more "history package" data structures 312, each corresponding to a version of the file. A file package 310 records the file's creation, last access, last archive date/time, and protection rights. A history package 312 records the location in the Integrity Server's file system, the location 316 on tape of the file version, the date/time that this version was created, its size, and a data checksum of the file contents. Similarly, each directory and volume have a corresponding data structure. As a version moves within the Integrity Server (for instance, from disk cache 120 to tape 150–153), the location mark 316 in the history package is updated to track the files and versions.

Other events in the "life" of a file are recorded in the catalog by history packages associated with the file's file package. Delete packages record that the file was deleted from the protected server at a given time (even though one or more back versions of the file are retained by the Integrity Server).

Other embodiments are within the following claims.

What is claimed is:

1. A method for managing copies of a protected set of files on a bounded number of sequential-access volumes, the method being executed by computer and comprising:

(a) from among a plurality of said sequential-access volumes, selecting one as the current volume;

(b) when an external process independent of the sequential-access volumes alters the contents of one of the protected files to produce a new current version of the protected file, snapshotting the new current version of the altered protected file at the end of the current volume;

(c) when the current volume is full to a defined limit, selecting a new volume to be the current volume;

(d) maintaining the population of an active set of said sequential-access volumes at or below said bounded number, said active set being the minimum set of the most-recently-current of said volumes that together contain at least one version of each of said protected files, by:

as said population approaches or equals said bounded number, selecting for compaction one volume of said active set, and copying from the compaction volume to the current volume those versions of file versions stored on the compaction volume not having a more recent version stored on the active set; and (e) repeating steps (b)–(d) while the external process continues.

2. The method of claim 1, further comprising:

when the contents of one of the protected files is altered to produce a new current version of the protected file, snapshotting the new current version of the altered protected file to a direct access storage cache; and queueing in a write queue the cache copy of the file for later writing to said current volume.

3. The method of claim 2, further comprising:

when dequeueing a file from said write queue for writing to said current volume, reviewing said write queue for a later version of the dequeued file, and suppressing writing to said current volume of any version other than the latest queued version of said dequeued file.

4. The method of claim 2, further comprising:

copying a file version from the compaction volume to said storage cache; and queueing the file from the compaction volume in a write queue as the cache copy of the file for later writing to said current volume.

5. The method of claim 4, further comprising:

when dequeueing a file from said write queue for writing to said current volume, reviewing said write queue for a later version of the dequeued file, and suppressing writing of any version other than the latest queued version of said dequeued file.

6. The method of claim 1, wherein:

recently-compacted volumes are maintained as a legacy set of volumes containing additional copies of current versions and non-current versions of protected files, and storage records corresponding to the file versions stored on the legacy set are retained allowing prompt retrieval of those copies as requested by the external process.

7. The method of claim 6, further comprising:

concurrently with steps (b)–(c), enqueueing versions of said altered files for writing to an archival set of volumes distinct from said active and legacy volumes;

wherein all volumes of the active volume set are resident in an auto-loader, and all file versions of said active volume set can be retrieved with a relatively small latency; and wherein filled volumes of said archival set are scheduled for removal from said auto-loader, retaining only a single archival volume in said auto-loader.

8. The method of claim 7, wherein after a file version is written to the current volume, queuing said file version to be written to the current archival volume in an archival queue.

9. The method of claim 8 further comprising:

retaining a file version in said archival queue for a time; and when dequeueing a file from said archival queue for writing to said current archival volume, reviewing said archival queue for a later version of the dequeued file, and suppressing writing to said current archival volume of any version other than the latest queued version of said dequeued file.

10. The method of claim 7 further comprising:

maintaining at a small number a population of said archival volumes preceding each said archival volume that taken together form a recovery set, a recovery set being a sequence of consecutive ones of said archival volumes that collectively contain at least one version of every file of the protected set, by copying to said current archival volume those file versions copied from the compaction volume to the current volume.

11. The method of claim 10, further comprising:

for each archival volume, recording a number of archival volumes preceding said each archival volume that together form a recovery set ending with said each archival volume.

12. The method of claim 1, wherein:

all volumes of said active set are loaded in a cartridge tape autoloader.

13. The method of claim 1, wherein:

the altering of the file servers' protected files includes creation of a file by the external process.

14. A method for protecting a protected set of files of varying size and stored on direct-access mass storage devices of a plurality of file server nodes of a network of computers, the method comprising:

at a rate similar to the rate at which said files are altered by an external process, snapshotting recently-altered protected ones of said files from said direct-access mass storage devices to an archive storage cache, a new snapshot of a given file in said storage cache displacing any older snapshot of said given file in existence in said storage cache;

copying, continuously but at a lower rate than said snapshotting that allows a significant proportion of said snapshotted versions to be displaced from said archive storage cache, non-displaced snapshotted versions from said storage cache to removable mass storage media.

15. The method of claim 14, further comprising:

periodically verifying the contents of the protected files against the contents of the versions stored on said removable mass storage media.

16. The method of claim 15 wherein avoiding copying contents of verified files over the network, or reading the removable media, during the verifying, by comparing a summary value of the content of a protected file with a summary value of the content of the stored snapshot.

17. The method of claim 14, wherein:

said lower rate is only a little lower, so that a large fraction of said snapshotted versions survive said displacing and are written to said removable mass storage media.

18. The method of claim 17 wherein an active set, being a minimum set of most-recently-written volumes of said media that together contain at least one version of each of said protected files, is maintained at a bounded number of volumes, by further steps comprising:

(a) from among a plurality of said removable mass storage media, selecting one as the current volume;

(b) when the contents of one of the files is altered to produce a new current version of the file, snapshotting the new current version of the altered file to the current volume;

(c) when the current volume is full to a defined limit, selecting a new volume to be the current volume;

(d) maintaining the population of said active set at no greater than said bounded number, by:

as said population approaches or equals said bounded number, selecting for compaction one volume of said active set, and copying from the compaction volume to the current volume those versions of file versions stored on the compaction volume not having a more recent version stored on the active set; and (e) repeating steps (b)–(d) while the external process continues.

19. The method of claim 18, further comprising:

from among the volumes previously compacted, periodically expiring some of said volumes, leaving short sequences of consecutively-generated volumes that taken together store at least one copy of every file of said protected set.

20. The method of claim 14, wherein:

said removable mass storage media form an archive suitable for off-site storage, said lower rate of copying being much lower than the rate of snapshotting so that a large fraction of said snapshotted versions are displaced and not written to removable mass storage.

21. The method of claim 20, further comprising:

maintaining at a small number of volumes a population of said volumes of said off-site media preceding each said off-site volume that taken together form a recovery set, a recovery set being a sequence of consecutive ones of said off-site volumes that collectively contain at least one version of every file of the protected set, by periodically refreshing said storage cache with copies of protected files not recently altered, and copying said refreshed files from said storage cache to said removable mass storage media.

22. The method of claim 20, further comprising:

periodically expiring media from said off-site archive, leaving short sequences of consecutively-generated volumes of said off-site archive that taken together store at least one copy of every file of said protected set.

23. The method of claim 14, wherein:

the altering of the file servers' files by the external process includes creation of new files in the protected set by the external process, and said newly-created ones of said protected files are snapshotted to said archive storage cache.

24. The method of claim 14, further comprising:

recording that a protection process holds the file open during said snapshotting; and when said external process requests access to a file, consulting said recording to determine whether the file is currently held open by said protection process, and:
if the file is currently held open by said protection process, blocking said external process until said protection process completes snapshotting of the file, and
if the file is not currently held open by said protection process, or when the file is released by the protection process, proceeding to open the file in accord with the file open protocol of said protected computer.

25. In a computer data protection system, a method comprising the steps of:

traversing a file system of a protected computer by a protection process, snapshotting files of said file system to removable storage media, and
as each file is opened for said snapshotting, recording that the protection process currently holds the file open, and
as the protection process completes said snapshotting, recording that the protection process has released the file; and
when a client process requests access to a file, consulting said recording to determine whether the file is currently open by said protection process, and if the file is currently held open by said protection process, blocking said client process until said protection process releases the file, and
if the file is not currently held open by said protection process, or when the protection process completes said snapshotting, proceeding to open the file in accord with the file open protocol of said protected computer.

26. The method of claim 25, wherein:

said protected computer is one of a network of computers, and said client process is hosted on a client computer of said network other than said protected computer.

27. The method of claim 2, wherein:

said sequential-access volumes are removable mass storage media in a form suitable for an archive for off-site storage, said snapshotting being carried out at a rate similar to the rate at which said files are altered by an external process, a new snapshot of a given file in said storage cache displacing any older snapshot of said given file in existence in said storage cache;

copying, continuously but at a lower rate than said snapshotting that allows a significant proportion of said snapshotted versions to be displaced from said archive storage cache, non-displaced snapshotted versions from said storage cache to said removable mass storage media, said lower rate of copying being much lower than the rate of snapshotting so that a large fraction of said snapshotted versions are displaced and not written to removable mass storage.

28. The method of claim 27, further comprising:

maintaining at a small number of volumes a population of said volumes of said off-site media preceding each said off-site volume that taken together form a recovery set, a recovery set being a sequence of consecutive ones of said off-site volumes that collectively contain at least one version of every file of the protected set, by periodically refreshing said storage cache with copies of protected files not recently altered, and copying said refreshed files from said storage cache to said removable mass storage media.

29. The method of claim 27, further comprising:

periodically expiring media from said off-site archive, leaving short sequences of consecutively-generated volumes of said off-site archive that taken together store at least one copy of every file of said protected set.

30. The method of claim 2, wherein:

the altering of the proctected set of files by the external process includes creation of new files in the protected set by the external process, and said newly-created ones of said protected files are snapshotted to said storage cache.

31. The method of claim 2, further comprising:

recording that a protection process holds the file open during said snapshotting; and when said external process requests access to a file, consulting said recording to determine whether the file is currently held open by said protection process, and:
if the file is currently held open by said protection process, blocking said external process until said protection process completes snapshotting of the file, and
if the file is not currently held open by said protection process, or when the file is released by the protection process, proceeding to open the file in accord with the file open protocol of said protected computer.

* * * * *